US006948159B2

(12) United States Patent
Born et al.

(10) Patent No.: US 6,948,159 B2
(45) Date of Patent: Sep. 20, 2005

(54) AUTOMATIC COMPILATION OF ELECTRONIC TELECOMMUNICATIONS SYSTEM MESSAGE GENERATION CODE

(75) Inventors: Timothy Dennis Born, St. Charles, IL (US); Mark Gregory, Calbourne (GB)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/920,422

(22) Filed: Aug. 1, 2001

(65) Prior Publication Data

US 2004/0117775 A1 Jun. 17, 2004

(51) Int. Cl.[7] .............................................. G06F 9/45
(52) U.S. Cl. ...................... 717/143; 717/136; 717/137; 717/141; 717/142
(58) Field of Search ................................ 717/137, 141, 717/142, 136, 143

(56) References Cited

U.S. PATENT DOCUMENTS

| | | | | |
|---|---|---|---|---|
| 5,291,583 A | * | 3/1994 | Bapat | 717/137 |
| 5,295,256 A | * | 3/1994 | Bapat | 717/141 |
| 5,802,146 A | * | 9/1998 | Dulman | 379/32.03 |
| 5,852,825 A | * | 12/1998 | Winslow | 707/6 |
| 5,862,383 A | * | 1/1999 | Laitinen | 717/142 |
| 5,892,950 A | * | 4/1999 | Rigori et al. | 717/146 |
| 6,052,526 A | * | 4/2000 | Chatt | 717/136 |
| 6,158,031 A | * | 12/2000 | Mack et al. | 714/724 |
| 6,182,153 B1 | * | 1/2001 | Hollberg et al. | 719/315 |
| 6,304,915 B1 | * | 10/2001 | Nguyen et al. | 709/250 |

OTHER PUBLICATIONS

Williamson, et al., "Independent active program representation using ASN.1", 1999, ACM, p. 69–88.*

* cited by examiner

Primary Examiner—Wei Y. Zhen
Assistant Examiner—Qamrun Nahar

(57) ABSTRACT

A method and apparatus of generating code for producing messages in a processor; the messages being in conformance with the ASN.1 (Abstract Syntax Notation.1). Standards of the International Telecommunications Union (ITU), and the International Standards Organization (ISO). An ASYN software tool uses input describing protocol in the ASN.1 Standard, and uses a general script input to describe the rules for manipulating the ASN.1 inputs. The output of ASYN tool is used together with Application Programmer input describing the requirements for a specific application as inputs to a CASE (Computer Aided Software Engineering) software tool development environment. The output of the CASE tool development environment is then used by a Compiler for the Object Processor which provides the messages. Advantageously, changes in the Application Programmer input can be compiled without further manual effort. Advantageously, once the general script input file has been created, changes in the ASN.1 input file can be compiled without further manual effort.

6 Claims, 3 Drawing Sheets

AUTOMATIC COMPILATION OF ELECTRONIC TELECOMMUNICATIONS SYSTEM MESSAGE GENERATION CODE

TECHNICAL FIELD

This invention relates to the automatic generation of message generation code that is in accordance with the protocol specific by the ASN.1 (Abstract Syntax Notation.1), requirements of the International Telecommunications Union (ITU), and the International Standards Organization (ISO).

DESCRIPTION OF THE RELATED ART

The messages generated by electronic telecommunications systems are specified in a Abstract Syntax Notation (called ASN.1—a definition for which is specified in ITU documents X.680, 1, 2, & 3). Manufacturer throughout the world are required to describe and negotiate signaling between such electronic devices using the ASN.1 syntax; otherwise, many carriers would refuse to purchase machines from vendors who cannot specify the communications between their machinery and associated interacting devices in accordance with these standards.

In the prior art, there is no fully automatic system available for converting the description of the communication into code that executes that communication, and is made available for Programmers to incorporate that code into a (Computer Aided Software Engineering) CASE design tool, in order that the communication aspect of a system can be incorporated into a larger system design. In one prior art system, the ASN.1 specification is compiled in an ASN.1 Compiler, whose output is then fed into an Object Machine Compiler; the output of this stage is modified by an Application Programmer (in person) to be fed into the development environment; such as provided by the aforementioned CASE Tool. One such tool is ObjecTime, provided by the Rational Corporation. However, when this CASE Tool is used, a large body of Auxiliary Statements are required that have to be written by the Applications Programmer, to incorporate the output of the Object Machine Compiler into the design. The need for this extensive manual input lowers the integrity of the final product, because of the possibility of introducing errors in writing these Auxiliary Statements. It also requires a large amount of effort to generate these Auxiliary Statements manually. Further, if the manufacturer, or the telecommunications community, modifies the specification of the communication between those telecommunication devices, then a large amount of additional effort would be required.

SUMMARY OF THE INVENTION

The above problem is solved and an advance is made over the prior art in accordance with this invention, wherein the CASE Tool receives the output of a new ASN.1 Tool, called ASYN, and removes the need for manual intervention of the Applications Programmer, thus allowing the CASE Tool to generate all the output required that can be compiled by an Object Machine Compiler. Advantageously, the use of ASYN permits the by-passing of manual effort in processing the ASN.1 statements to produce Auxiliary Statements for use by the CASE Tool, and allows a new ASN.1 description to be automatically compiled. ASYN does not rely upon the specialized knowledge of the Application Programmer, or the reformatting of the ASN.1 into a tubular form to aid the comprehension of the Applications Programmer, in representing the ASN.1 formatted standard.

The external input to ASYN is the ASN.1 Source File. It contains the ASN.1 statements that define the communication protocol between telecommunications systems. An ASN.1 Lexical Analysis breaks down the ASN.1 source file into individual lexemes, words and other tokens. The ASN.1 Lexemes are processed by an ASN.1 Syntax Analysis process into an ASN.1 Data Repository. This analysis process guarantees that the ASN.1 input file is syntactically correct and deduces the meaning or vital information about each source line. This information is stored in a logical order in the ASN.1 Data Repository. This Data Repository is a Data Scheme that contains the meaning and associations of the ASN.1 Source File without any of its syntactic complexity.

Another input to the ASYN process is a GenScript Source configuration file. This source file contains the rules for creating any information required from data held in the ASN.1 Data Repository. This information can be created in any format. If the CASE Tool is changed, and an alternative output is required, then it is the GenScript that will require modification. The RULES found in GenScripts are a set of procedural statements that describe how to convert from the raw data in the ASN.1 Data Repository into contextualized information in a CASE Tool Intermediate file. A GenScript Lexical Analysis procedure splits the GenScript file into lexemes, words, and tokens, and stores them in an ordered list of GenScript Lexemes. The GenScript Lexemes are subject to the GenScript Syntax and semantic analysis. This process guarantees that the GenScript input is syntactically correct and converts its meaning into an interpretable internal format, GenScript Pre-compiled Functions. This format is interpreted by a virtual machine (GenScript Executor). The virtual machine executes the set of pre-compiled statements that allow the execution of sequences (lists of consecutive statements), conditional sequences, (a set of statements executed upon a condition being met), and looping (the repetition of a set of statements while a condition is valid), that is contained in the GenScript Source. The GenScript Executor executes the compiled statements and operates upon the data found in the ASN.1 Data Repository to create the CASE Tool Intermediate File.

The present invention inventively combines the analysis of ASN.1 source with precompiled functions generated from a Genscript source as inputs to a Genscript Executor; the output of this Genscript Executor is then compiled by an Intermediate CASE tool to act as the input to a target machine compiler.

A data processing system is used to run the programs discussed above to produce the desired machine code.

BRIEF DESCRIPTION OF THE DRAWING(S)

DETAILED DESCRIPTION

Figure 1:
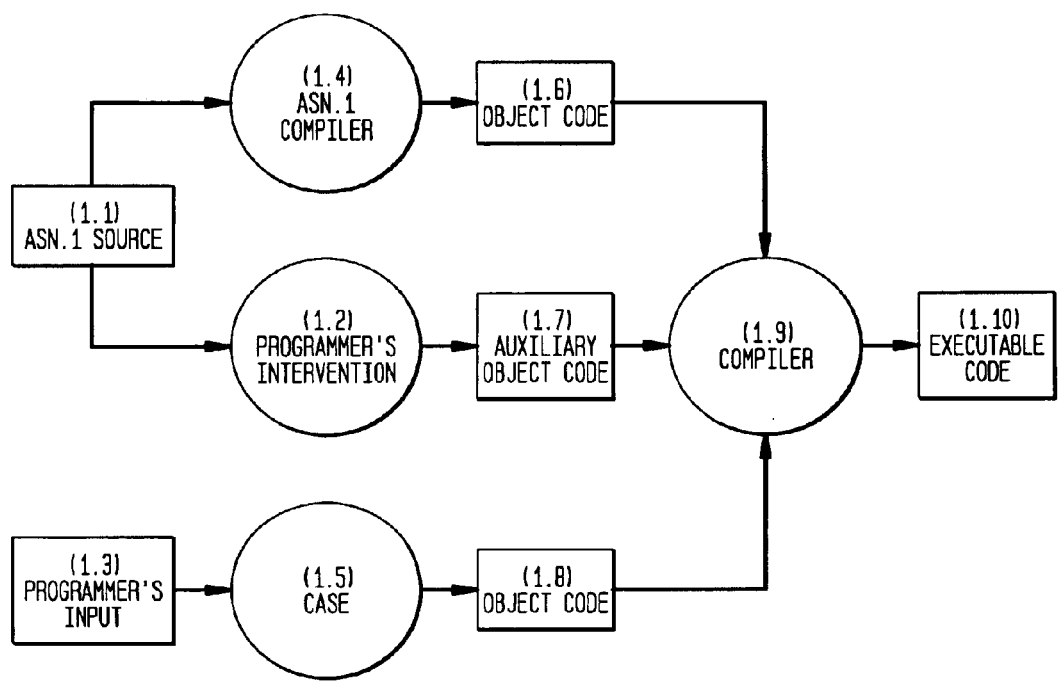
FIG. 1 is a block diagram illustrating the prior art.

FIG. 1 is a block diagram illustrating the overall process of the prior art. It consists of an ASN.1 Compiler (process 1.4), a development environment (or CASE Tool (process 1.5), and an Object Compiler (process 1.9). The inputs to the development environment are the Application Programmer's input describing what is to be performed on acceptance of messages contained in the protocol (definition 1.3) to produce object code (file 1.8) usually generated in the C or C++ languages. The ASN.1 Compiler receives as input the full complement of ASN.1 statements to define the communication protocol into and out of a telecommunications system (file 1.1), so that it might be designated (by the industry) as a standard. The ASN.1 statements are compiled using an existing compiler to produce object code (file 1.6) —usually generated in C or C++. The Applicants Programmer also needs to create/generate/invent (process 1.2), extra "glue" object code (file 1.7) to "tie together" (encode and decode instances of messages defined in the ASN.1 definition), the code generated by processes 1.4 and 1.5 in files 1.6 and 1.8. This is then all compiled together (process 1.9) to produce the final executable code (file 1.10).

Figure 2:
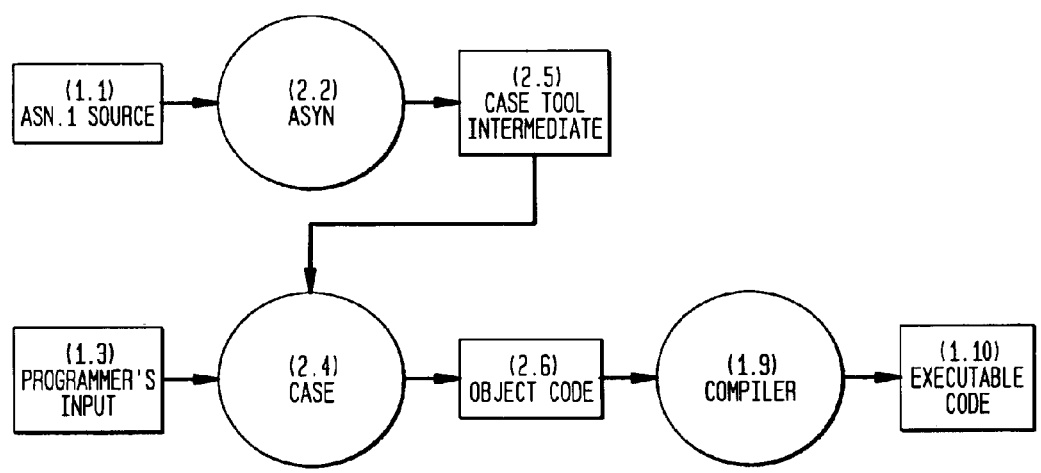
FIG. 2 is a block diagram illustrating the operation of the present invention.

FIG. 2 is a diagram showing the operation of Applications' invention, whose object is to avoid the repetitive and error prone manual effort required to generate C or C++ Auxiliary Statements to encode and decode instances of messages defined in ASN.1 definition. In the new system, the CASE Tool (process 2.4) receives two inputs: the Application Programmer's input (definition 1.3), previously described with respect to FIG. 1, and the output of an ASYN Tool (process 2.2). The inputs to the ASYN Tool (file 1.1) are identical to the input to the ASN.1 Compiler (process 1.4, FIG. 1). The output from the ASYN Tool (file 2.5) is an intermediate file that is an input to the CASE Tool, and is generated in a language that is specific to the CASE Tool. The CASE Tool now generates the C or C++ object code (file 2.6), previously generated by the ASN.1 Compiler (process 1.4, FIG. 1), the Application Programmer (process 1.2, FIG. 1), and the CASE Tool itself, (process 1.5, FIG. 1). The Object Machine Compiler (process 1.9) then uses the object code generated by the CASE Tool as in the prior art.

Figure 3:
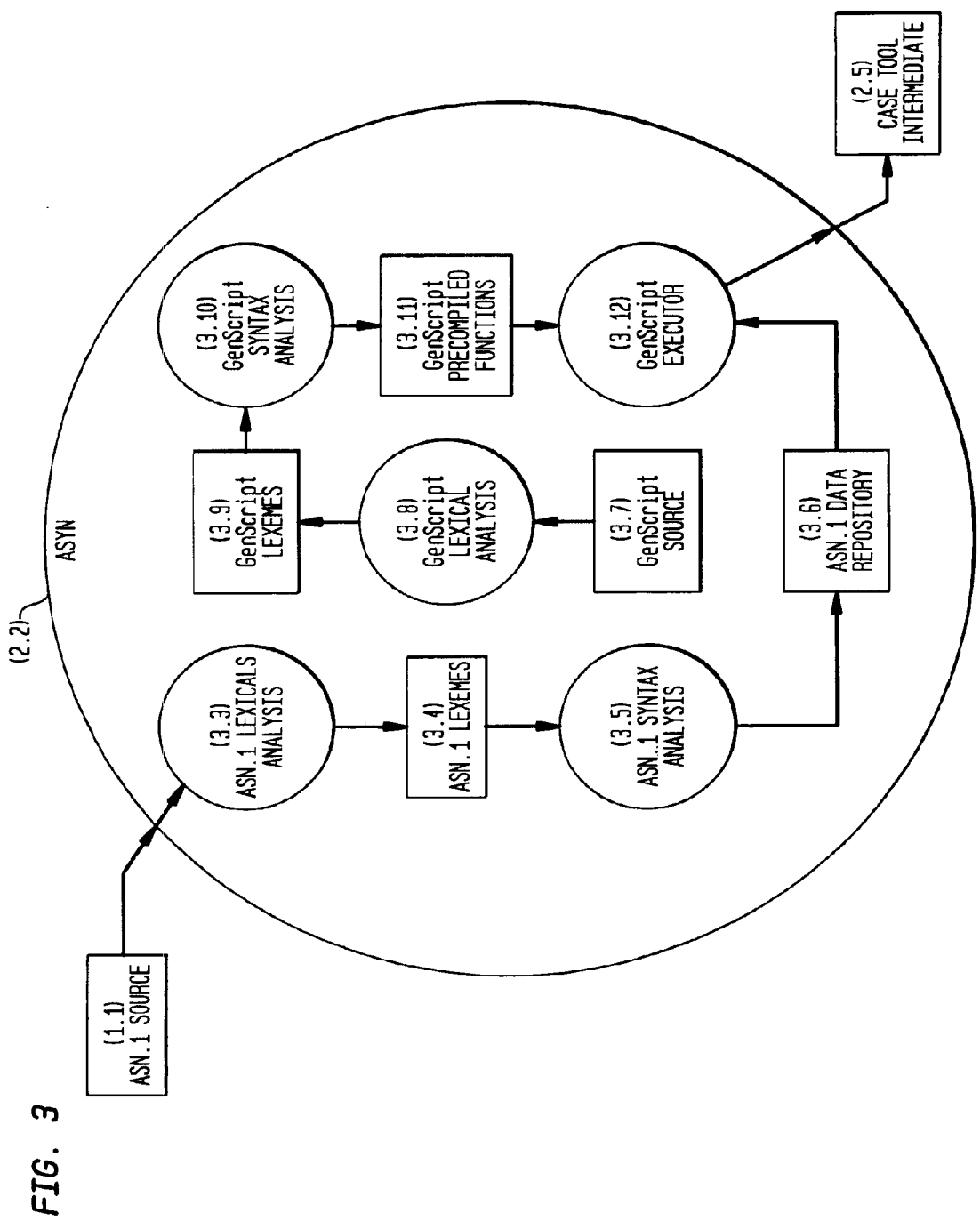
FIG. 3 is a block diagram illustrating the details of the ASN.1 Tool, ASYN, of the present invention.

FIG. 3 is a diagram illustrating the operation of the ASYN Compiler. The external input to ASYN is (file 1.1), the ASN.1 Source File (file 1.1, FIG. 1, and file 1.1, FIG. 2). It contains the ASN.1 statements that define the communication protocol between telecommunications systems. The ASN.1 Lexical Analysis (process 3.3) breaks down the ASN.1 source file into individual lexemes, words and other tokens. Lexemes are consecutive groups of characters from a source file that are logically grouped together to produce a "token". Tokens can be numeric (0x13b2, 0167, 12394), alphanumeric (name, file 1, size 3), symbolic (+, *, +=), or separators <TAB>, <SPACE>, <CRLF>). These are stored in an ordered list of ASN.1 Lexemes (repository 3.4). The ANS.1 Lexemes are processed in the ASN.1 Syntax Analysis (process 3.5) into the ASN.1 Data Repository (repository 3.6). This process guarantees that the ASN.1 input file is syntactically correct and deduces the meaning or vital information about each source line. This information is stored in a logical order in the ASN.1 Data Repository (3.6). This Data Repository is a Data Schema that contains the meaning and associations of the ASN.1 Source File without any of its syntactic complexity.

An input to the ASYN process in the GenScript Source configuration file (file 3.7). This source file contains the rules for creating any information required from data held in the ASN.1 Data Repository. This information can be created in any format. If the CASE Tool is changed, and an alternative output is required then it is the GenScript that will require modification. The RULES found in GenScripts are a set of procedural statements that describe how to convert from the raw data in the ASN.1 Data Repository (repository 3.6), into contextualized information in the CASE Tool Intermediate (file 2.5), e.g., "for each data type in the project, produce and ObjecTime data definition". The GenScript Lexical Analysis procedure (process 3.8) splits the GenScript file into lexemes, words, and tokens, and stores them in an ordered list of GenScript Lexemes (repository 3.9). The GenScript Lexemes are subject to the GenScript Syntax and semantic analysis (process 3.10). This process guarantees that the GenScript input is syntactically correct and converts its meaning into an interpretable format (GenScript Pre-compiled Functions (repository 3.11)). This format is interpreted by a virtual machine (GenScript Executor (process 3.12)). The virtual machine executes the set of pre-compiled statements that allow the execution of sequences (lists of consecutive statements), conditional sequences, (a set of statements executed upon a condition being met), and looping, (the repetition of a set of statements while a condition is valid), that is contained in the GenScript Source (file 3.7). The GenScript Executor executes the compiled statements and operates upon the data found in the ASN.1 Data Repository (repository 3.6), to create the CASE Tool Intermediate File (file 2.5).

The programs discussed above are executed on a data processing system to compile the desired executable code for a target switching machine.

The above description is one preferred embodiment of Applications' invention. Many other embodiments will be apparent to those of ordinary skill in the art without departing from the scope of the invention. The invention is limited only by the attached claims.

What is claimed is:

1. A method of generating compiled code for producing messages in conformance with an ASN (Abstract Syntax Notation) Standard, comprising the steps of:

using a syntax analysis process, compiling an ASN input file describing rules of said ASN Standard into an ASN Data Repository comprising a data structure of said ASN input file;

generating a file of general script lexemes using a lexical analysis of a general script source containing rules for creating information in said ASN Data Repository;

using a syntax analyzer, analyzing said general script lexemes to create a file of general script precompiled functions;

using a general script Executor to act upon entries in said ASN Data Repository with said general script precompiled functions to produce an output file; and using an Application Programmer input file describing requirements for messages for a particular application, and said output file as inputs to a CASE tool to generate outputs for use by a compiler for a particular processor.

2. The method of claim 1, further comprising the step of:

compiling code for said particular processor using said output of said CASE tool in said compiler for said particular processor.

3. The method of claim 1, wherein the step of compiling said ASN input file into said ASN Data Repository, comprises the steps of:

generating said ASN input file through a lexical analysis of ASN source statements to generate a file of ASN lexemes; and using a syntax analyzer to compile said ASN lexemes into said ASN Data Repository.

4. Apparatus for compiling code for producing messages in conformance with an ASN (Abstract Syntax Notation) Standard, comprising:

a data processing system, operative under program control for executing the following steps:

using a syntax analysis process, compiling an ASN input file, describing rules of said ASN Standard into an ASN Data Repository comprising a data structure of said ASN input file;

generating a file of general script lexemes using a lexical analysis of a general script source containing rules for creating information in said ASN Data Repository;

using a syntax analyzer, analyzing said general script lexemes to create a file of general script precompiled functions;

using a general script Executor to act upon entries in said ASN Data Repository with said general script precompiled functions to produce an output file; and using an Application Programmer input file describing requirements for messages for a particular application, and said output file as inputs to a CASE tool to generate outputs for use by a compiler for a particular processor.

5. The apparatus of claim 4, wherein said data processing system is further operative under program control to execute the step of:

compiling code for said particular processor using said output of said CASE tool in said compiler for said particular processor.

6. The apparatus of claim 4, wherein said data processing system is further operative under program control for executing the step of compiling said ASN input file into said ASN Data Repository by executing the steps of:

generating said ASN input file through a lexical analysis of ASN source statements to generate a file of ASN lexemes; and using a syntax analyzer to compile said ASN lexemes into said ASN Data Repository.

* * * * *